(12) United States Patent
Leme (10) Patent No.: US 11,775,742 B2
(45) Date of Patent: *Oct. 3, 2023

(54) INTEGRATING ADDITIONAL DATA SOURCES INTO A MOBILE AUTOFILL MECHANISM

(71) Applicant: Google LLC, Mountain View, CA (US)

(72) Inventor: Felipe Leme, Belmont, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,289

(22) Filed: Jul. 7, 2022

(65) Prior Publication Data

US 2022/0343060 A1   Oct. 27, 2022

Related U.S. Application Data

(63) Continuation of application No. 17/283,095, filed as application No. PCT/US2018/060000 on Nov. 9, 2018, now Pat. No. 11,409,954.

(51) Int. Cl.
*G06F 40/174* (2020.01)
*G06F 3/04812* (2022.01)
*G06F 3/0482* (2013.01)
*G06F 3/0484* (2022.01)

(52) U.S. Cl.
CPC .......... *G06F 40/174* (2020.01); *G06F 3/0482* (2013.01); *G06F 3/0484* (2013.01); *G06F 3/04812* (2013.01)

(58) Field of Classification Search
CPC .. G06F 40/174; G06F 3/04812; G06F 3/0482; G06F 3/0484
See application file for complete search history.

(56) References Cited

U.S. PATENT DOCUMENTS

| | | |
|---|---|---|
| 8,645,825 B1 | 2/2014 | Cornea et al. |
| 10,942,959 B1 | 3/2021 | Haider |
| 2005/0257148 A1 | 11/2005 | Goodman et al. |
| 2015/0205776 A1 | 7/2015 | Bhatia et al. |
| 2015/0317295 A1 | 11/2015 | Sherry et al. |
| 2017/0322920 A1 | 11/2017 | Meschkat |

(Continued)

OTHER PUBLICATIONS

Communication pursuant to Article 94(3) EPC from counterpart European Application No. 18826120.0 dated Apr. 29, 2022, 7 pp.

(Continued)

*Primary Examiner* — Nicholas Ulrich
(74) *Attorney, Agent, or Firm* — Shumaker & Sieffert, P.A.

(57) ABSTRACT

An example method includes requesting, by a user device from a remote provider and from a local provider, candidate data for use in autofill for an application. The method further includes receiving a first data set from the remote provider and a second data set from the local provider. The method additionally includes detecting that an input field of the application has focus, where the input field is included in both sets. The method further includes responsively causing a selectable list to be displayed on the user device, where the selectable list includes a first selectable option corresponding to the first data set and a second selectable option corresponding to the second data set. The method also includes receiving user input data indicating a selected data set and responsively filling one or more candidate values from the selected data set into one or more corresponding input fields of the application.

20 Claims, 7 Drawing Sheets

(56) References Cited

U.S. PATENT DOCUMENTS

2017/0357627 A1  12/2017 Peterson et al.
2018/0181866 A1   6/2018 Dalle et al.
2018/0260086 A1   9/2018 Leme et al.
2019/0354625 A1  11/2019 Toudji

OTHER PUBLICATIONS

Communication pursuant to Rules 161(1) and 162 EPC from counterpart European Application No. 18826120.0 dated Apr. 23, 2021, 3 pp.
International Preliminary Report on Patentability from International Application No. PCT/US2018/060000 dated May 11, 2021, 7 pp.
International Search Report and Written Opinion of International Application No. PCT/US2018/060000 dated Jul. 4, 2019, 10 pp.
Pancone, "How to disable and clear autofill info in your browser", Parishsoft, Retrieved from: https://support.parishsoft.corn/hc/en-us/articles/360004132232-PS-Adrinistration-Browser-How-to-disable-and-clear-autofill-info-in-your-browser, May 23, 2018 6 pp.
Prosecution History from U.S. Appl. No. 17/283,095, now issued U.S. Pat. No. 11,409,954, dated Apr. 6, 2021 through Apr. 5, 2021, 34 pp.
Response to Communication pursuant to Article 94(3) EPC dated Apr. 29, 2022, from counterpart European Application No. 18826120.0 filed Oct. 26, 2022, 36 pp.
Response to Communication Pursuant to Rules 161(1) and 162 EPC dated Apr. 23, 2021, from counterpart European Application No. 18826120.0, filed Oct. 27, 2021, 26 pp.

INTEGRATING ADDITIONAL DATA SOURCES INTO A MOBILE AUTOFILL MECHANISM

CROSS-REFERENCE TO RELATED DISCLOSURES

This application is a continuation of U.S. patent application Ser. No. 17/283,095, filed on Apr. 6, 2021, which is a national stage application under 35 U.S.C. § 371 International Application No. PCT/US2018/060000, filed Nov. 9, 2018, each of which are explicitly incorporated herein by reference in their entirety.

BACKGROUND

Many modern computing devices, including mobile devices, mobile phones, personal computers, and tablets, provide user interfaces (UIs) for permitting users to interact with the computing device. For example, application programs can use the UI to communicate with a user using images, text, and graphical elements such as windows, dialogs, pop-ups, images, buttons, scrollbars, and icons. The UI can also receive inputs from devices such as touch screens, a presence-sensitive display, computer mice, keyboards, and other devices to permit the user to control the UI, and thus the application program.

In some cases, the UI can be used to interact with an operating system to manage the computing device. For example, the operating system can have a control panel or setting application that uses the UI to draw one or more windows related to control settings for some aspect(s) of the computing device, such as audio controls, video outputs, computer memory, and human language(s) used by the operating system (e.g., choose to receive information in English, French, Mandarin, Hindi, Russian, etc.). The control panel/settings application can receive subsequent input related to the window(s) using the UI. The UI can provide the inputs to the operating system, via the control panel/settings application, to manage the computing device.

SUMMARY

Example systems and methods allow the operating system of a user device to facilitate autofill of an application with the help of both a remote provider and a local provider. In some examples, the local provider is the application itself. In additional examples, the local provider is a system-provided autofill provider. In additional examples, multiple remote providers and/or multiple local providers may be used to help autofill an application.

In one aspect, a method is provided that includes requesting, by a user device from a remote provider and from a local provider, candidate data for use in autofill for an application displayed on the user device. The method further includes receiving, from the remote provider, a first data set comprising one or more candidate values corresponding to a first set of one or more input fields of the application. The method additionally includes receiving, from the local provider, a second data set comprising one or more candidate values corresponding to a second set of one or more input fields of the application. The method also includes detecting that an input field of the application has focus, where the input field is included in the first set and the second set. The method further includes responsively causing a selectable list to be displayed on the user device, where the selectable list includes a first selectable option corresponding to the first data set from the remote provider and a second selectable option corresponding to the second data set from the local provider. The method additionally includes receiving user input data indicating a selected data set from the selectable list. The method further includes responsively filling one or more candidate values from the selected data set into one or more corresponding input fields of the application.

In another aspect, a user device is provided. The user device comprises an operating system configured to request, from a remote provider and from a local provider, candidate data for use in autofill for an application displayed on the user device. The operating system is further configured to receive, from the remote provider, a first data set comprising one or more candidate values corresponding to a first set of one or more input fields of the application. The operating system is additionally configured to receive, from the local provider, a second data set comprising one or more candidate values corresponding to a second set of one or more input fields of the application. The operating system is also configured to detect that an input field of the application has focus, where the input field is included in the first set and the second set. The operating system is additionally configured to responsively cause a selectable list to be displayed on the user device, where the selectable list includes a first selectable option corresponding to the first data set from the remote provider and a second selectable option corresponding to the second data set from the local provider. The operating system is also configured to receive user input data indicating a selected data set from the selectable list. The operating system is further configured to responsively fill one or more candidate values from the selected data set into one or more corresponding input fields of the application.

In another aspect, a non-transitory computer readable medium is provided having stored therein instructions executable by one or more processors to cause an operating system of a user device to perform functions. The functions include requesting, by a user device from a remote provider and from a local provider, candidate data for use in autofill for an application displayed on the user device. The functions also include receiving, from the remote provider, a first data set comprising one or more candidate values corresponding to a first set of one or more input fields of the application. The functions further include receiving, from the local provider, a second data set comprising one or more candidate values corresponding to a second set of one or more input fields of the application. The functions also include detecting that an input field of the application has focus, where the input field is included in the first set and the second set. The functions further include responsively causing a selectable list to be displayed on the user device, where the selectable list includes a first selectable option corresponding to the first data set from the remote provider and a second selectable option corresponding to the second data set from the local provider. The functions additionally include receiving user input data indicating a selected data set from the selectable list. The functions further include responsively filling one or more candidate values from the selected data set into one or more corresponding input fields of the application.

In another aspect, a system is provided that includes means for requesting, by a user device from a remote provider and from a local provider, candidate data for use in autofill for an application displayed on the user device. The system also includes means for receiving, from the remote provider, a first data set comprising one or more candidate values corresponding to a first set of one or more input fields of the application. The system further includes means for receiving, from the local provider, a second data set comprising one or more candidate values corresponding to a second set of one or more input fields of the application. The system also includes means for detecting that an input field of the application has focus, where the input field is included in the first set and the second set. The system further includes means for responsively causing a selectable list to be displayed on the user device, where the selectable list includes a first selectable option corresponding to the first data set from the remote provider and a second selectable option corresponding to the second data set from the local provider. The system additionally includes means for receiving user input data indicating a selected data set from the selectable list. The system further includes means for responsively filling one or more candidate values from the selected data set into one or more corresponding input fields of the application.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

It will be readily understood that the aspects of the present disclosure, as generally described herein, and illustrated in the Figures, can be arranged, substituted, combined, separated, and designed in a wide variety of different configurations, all of which are contemplated herein.

I. Overview

User devices, including mobile devices, mobile phones, personal computers, and tablets, are ubiquitous in modern communication networks. Many of these devices are capable of running one or more applications while facilitating communication within such networks. Further, many of these devices also provide one or more UIs for permitting users to interact with the user device.

For example, a user may use a UI to communicate information to be used by an application on the user device through the use of images, text, and other graphical elements. The UI can also receive inputs from numerous devices connected to the user device, such as touch screens, a presence-sensitive display, computer mice, keyboards, and other devices that permit the user to control the UI, and thus the application.

In an optimal scenario, the user would be able to effectively and efficiently use the UI to communicate such information; however, one or more factors may impose a limitation on the user's ability to do so. Thus, if operating under such a limitation, as the need to communicate more and more information grows, the ability to communicate this information effectively and efficiently may become restricted.

By way of example, for user devices with small screens, typing extensive amounts of text into the UI to communicate information to be used by an application may be very difficult, especially if the text is also difficult for the user to remember. Accordingly, it may be advantageous for the application to be able to remember this information because it would not have to be communicated again the next time the application was to be employed by the user. It is plausible, however, that as the number of applications with which a user attempts to communicate grows, the burden imposed by using the UI to communicate extensive amounts of text to each of these applications (for the first time or otherwise) may burden the user. As a result, users may become less engaged in these applications (or abandon their use altogether) once prompted to enter such information.

Example systems disclosed herein allow the user of the user device to effectively and efficiently communicate information to be used by such applications by engaging the operating system of the user device to serve as an intermediary to facilitate autofill across multiple applications with the help of a remote provider. A request for autofill data for a specific application may be sent from the user device to the remote provider. The remote provider may respond with candidate data that may be autofilled into input fields of the application. By leveraging a remote provider, user data inputted in an application running on one user device may advantageously be used to autofill the same or a different application running on a different user device at a later point in time.

In some examples, it may be useful to provide a user with the option to select autofill data from both a remote provider and a local provider. In such examples, the local provider may be the application itself, such as a web browser. A number of types of applications may serve as local providers of autofill data as well, such as mapping applications, shopping applications, or ride sharing applications. The application may have different available autofill data than the remote provider. Thus, it may be beneficial to provide the user with a selectable list that includes selectable options for data sets from each of the remote provider and the local provider. The selectable list may include graphical icons or other indicators to notify the user of the source of each data set. However, the application may have its own UI autofill functionality. Such application UI autofill functionality can conflict with a UI provided by an operating system for facilitating autofill with data from a remote provider. This conflict may prevent autofill data being provided from one or from both sources, depending on how the application and the operating system are configured, or at best may confuse the user or make it difficult for them to select between different available data sets for autofill. Examples described herein mitigate this problem by providing an application programming interface (API) that integrates candidate data from a remote provider and a local provider within a single display interface.

Examples described herein may also allow for the integration of autofill data from a local system provider (e.g., a provider associated with the operating system) in addition to or instead of an application. In particular, the local system provider may receive temporary user interaction data from one application to use to autofill a second application. For instance, if a user types an address into a mapping application and then opens a shopping application, the local system provider may provide a data set to autofill the address into the shopping application. In some examples, the local system provider may include a machine learning model trained to identify relevant input fields of applications in order to determine candidate data for autofill based on recent user interaction with one or more applications on a user device. In further examples, the applications may be provided with an API to provide hints to identify specific fields containing user input data for subsequent use in autofill of other applications. Either way, an autofill data set provided by the local system provider may differ from a data set provided by a remote provider. In some examples, efficiency benefits may be achieved by leveraging information obtained to request autofill data from a remote provider to also request autofill data from a local system provider. Additionally, efficiency benefits may also be achieved by scraping user input data for future autofill a single time, and then providing the user input data to both the remote provider and the local system provider.

In some examples, the operating system of the user device may request and receive authorization from the user to engage in autofill for an application displayed on the UI of the user device. For example, to enable autofill, the operating system may prompt the user to set up autofill. In a further aspect, if the user only has one remote provider designated to help facilitate autofill, the user may be prompted to agree to use that remote provider; but if there are multiple remote providers designated, the user may be prompted to choose one or more remote providers. In either scenario, however, because engaging the operating system to perform autofill functions can involve sensitive and/or personal information specific to the user, the operating system may apprise the user of the details underlying the authorization of the autofill. These details may include accepting a detailed agreement concerning the operating system and/or a disclaimer associated with each remote provider, to inform the user and confirm her consent before authorizing the use of autofill with one or more of these remote providers.

In a further aspect, the operating system may detect an event which triggers the operating system to examine the contents displayed on the UI. In some examples, this event may include: the initiation of the application; the selection of an input field on the application; or a signal that an input field has focus (e.g., a particular text field has become engaged such that a keyboard is displayed on the UI), among other illustrative examples.

Then, once the operating system has detected such an event, and the operating system has examined the content displayed on the UI, the operating system may also determine what portion of this content does not contain sensitive user-specific information. In a further aspect, utilizing this portion of the content, the operating system may send a request to a remote provider to help facilitate autofill for the application by providing candidate date for use in the application. Such a request may be beneficial for the operating system and the user alike as it may allow the remote provider to securely and privately parse the content displayed on the UI to determine what information may be useful for facilitating autofill for the application (e.g., determining what input fields on the application may be autofilled).

The operating system may also send a request to one or more local providers for additional candidate data. As described in more detail below, the nature of the request to a local provider may differ depending on whether the local provider is an application or a local system provider. The requests to remote and local providers may be sent at the same time or in a particular order. In some examples, one or more local providers may be checked first so that the request to a remote provider may include an indication (e.g., a Boolean flag) indicating whether or not local autofill data is available. The indication may be used by the remote provider to adjust the contents of a message sent back by the remote provider for display to a user. For instance, when the remote provider is informed that local autofill data is available and thus the operating system will add an icon indicating which data set is from the remote provider, the remote provider may refrain from including the icon in its own message.

After such requests have been sent to remote and local providers, the operating system may receive responses containing data sets of candidate values, each corresponding to one or more input fields of the application displayed on the UI. When an input field has focus for which data sets provided by the remote provider and by the local provider each include a candidate value, a selectable list (in a drop-down menu or otherwise) may be displayed with selectable options corresponding to each data set. A user may therefore be able to select between remotely and locally provided autofill data sets in order to autofill the application. When a user selection is made, the operating system may fill one or more input fields of the application displayed on the UI with one or more corresponding candidate values from the selected data set.

In further examples, a fill indicator (in the form of a graphic received from the remote provider or local provider or otherwise) may be displayed in the input fields to be filled with candidate values before the user selects a data set. This fill indicator indicates to the user the source of the autofill data. And, in additional examples, the operating system may receive a user's preselection of a selectable option from a selectable list and display a fill indicator in the input fields of the application that could be filled with the candidate values associated the preselected selectable option.

In further examples, a remote provider may be provided with user data for future autofill use after a user manually enters data in the input fields of an application displayed on the UI. More specifically, after scraping this data, the operating system may prompt the user to save the input data for future use and send the data to the remote provider selected by the user to help facilitate autofill for the application. The saving of this data may be accomplished by the operating system immediately transmitting the input data to the remote provider, or by temporarily holding the data until the user responds to the prompt, at which point, the operating system may send the data to the remote provider. Either way, the input data may also be provided to a local system provider as well to facilitate future autofill with data from both the remote provider and the local provider.

II. Distributed Computing Architecture

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as to not unnecessarily obscure aspects of the embodiments.

Figure 1:
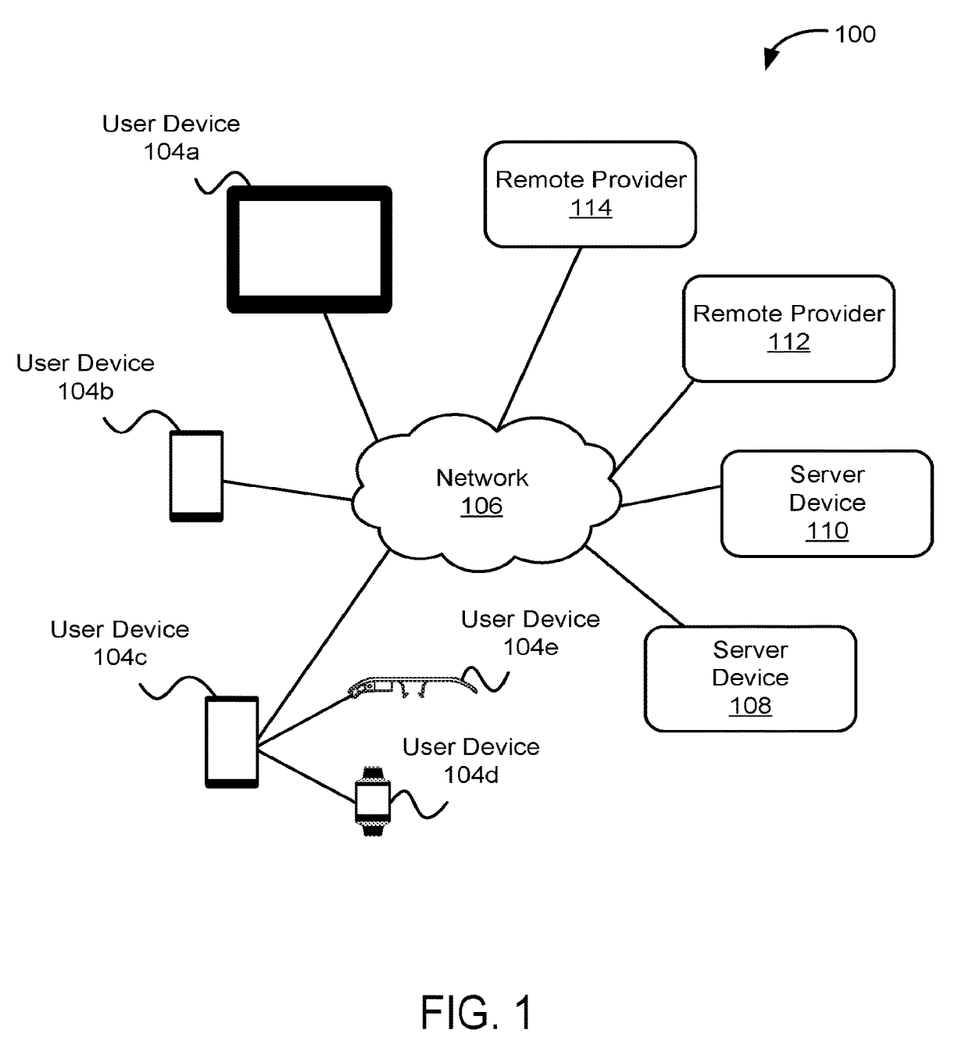
FIG. 1 depicts a distributed computing architecture, in accordance with example embodiments.

FIG. 1 depicts a distributed computing architecture 100 with server devices 108, 110 configured to communicate, via network 106, with user devices 104a, 104b, 104c, 104d, 104e, and remote providers 112 and 114, in accordance with example embodiments. Network 106 may correspond to a local area network (LAN), a wide area network (WAN), a corporate intranet, the public Internet, or any other type of network configured to provide communication paths between networked computing devices. Network 106 may also correspond to a combination of one or more LANs, WANs, corporate intranets, and/or the public Internet.

Although FIG. 1 only shows a small collection of user devices, distributed application architectures may serve tens, hundreds, or thousands of user devices. Moreover, user devices 104a, 104b, 104c, 104d, 104e (or any additional programmable devices) may be any sort of computing device capable of allowing a user to engage the operating system of the computing device to facilitate autofill across multiple applications and/or user devices with the help of a remote provider, such as an ordinary laptop computer, desktop computer, wearable computing device, mobile computing device, head-mountable device (HMD), network terminal, wireless communication device (e.g., a smartphone or cell phone), and so on. In some examples, such as indicated with user devices 104a, 104b, and 104c, user devices can be directly connected to network 106. In other embodiments, such as indicated with user devices 104d and 104e, user devices can be indirectly connected to network 106 via an associated computing device, such as user device 104c. In such embodiments, user device 104c can act as an associated computing device to pass electronic communications between user devices 104d and 104e and network 106. In still other embodiments not shown in FIG. 1, a user device can be both directly and indirectly connected to network 106.

Server devices 108, 110 may operate as part of a cloud-based server system that shares computer processing resources and data to computers and other devices on demand. In particular, server devices 108, 110 can be configured to perform one or more services requested by user devices 104a-104e. For example, server device 108 and/or 110 can provide content to user devices 104a-104e. In a further aspect, server device 108 and/or 110 may provide content to user devices 104a-104e directly or by facilitating the transmission of content requested from a third party. The content can include, but is not limited to, web pages, hypertext, scripts, binary data such as compiled software, images, audio, and/or video. The content can include compressed and/or uncompressed content. The content can be encrypted and/or unencrypted.

Remote providers 112, 114 may also operate as part of a cloud-based server system that shares computer processing resources and data to computers and other devices on demand. In particular, remote providers 112, 114 may provide, receive, store, manage, and transmit content on the network 106, in accordance with example embodiments. For example, remote provider 112 and/or 114 can receive a request for autofill data to be used by user devices 104a-104e, and generate and transmit a response containing the autofill data to devices connected to the network.

Within examples, server device 108 and/or 110 may provide content that facilitates autofill across multiple applications running on any or all of user devices 104a-104e with the help of remote provider 112 and/or 114. Additionally, server device 108 and/or 110 can provide user devices 104a-104e with access to software for database, search, computation, graphical, audio, video, World Wide Web/Internet utilization, and/or other functions. Many other examples of content are possible as well.

III. Method Flowchart and Examples

Figure 2:
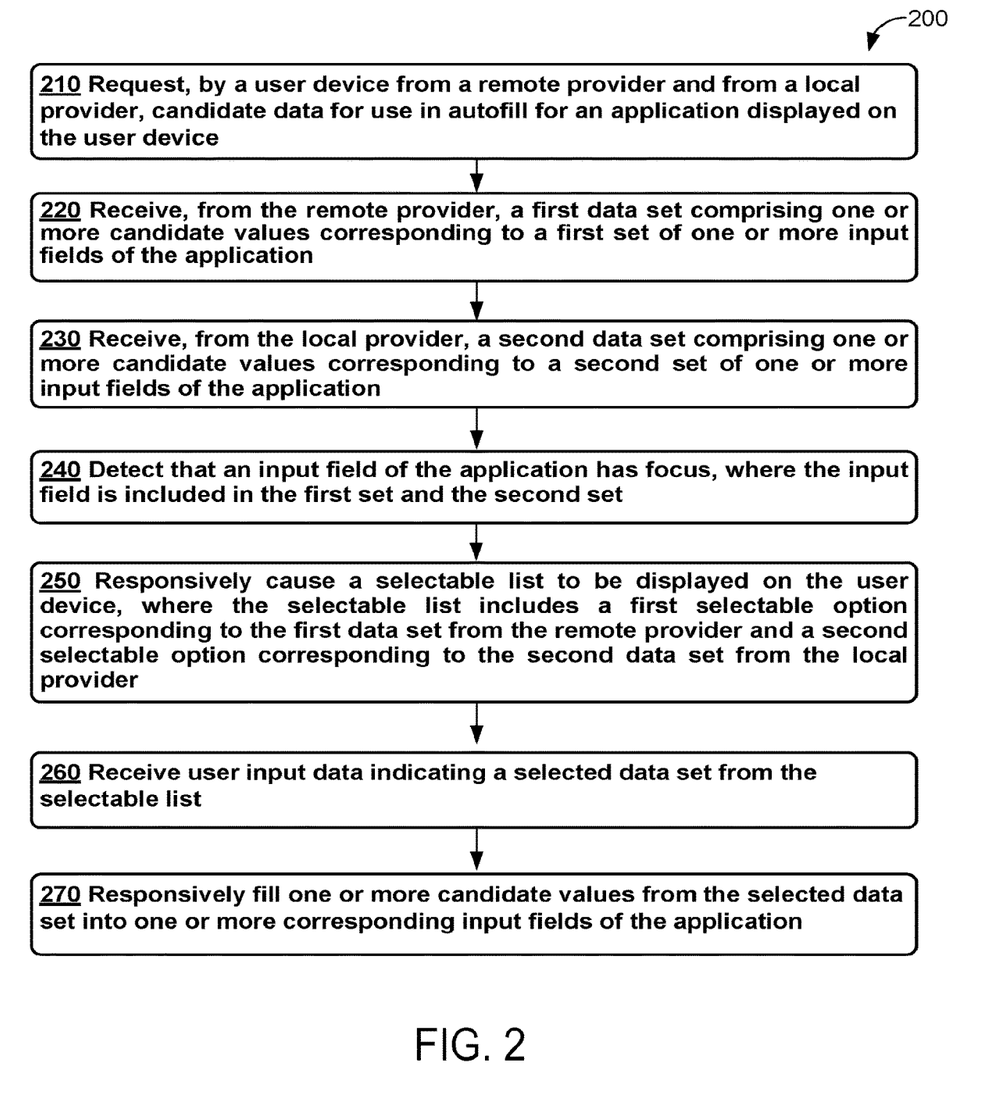
FIG. 2 is a flowchart of a method, in accordance with example embodiments.

FIG. 2 illustrates a flowchart showing a method 200 that may be performed to facilitate autofill with data from multiple providers. Method 200 may be carried out by one or more computing devices, such as the user devices 104a-104e and remote provider 112 and/or 114, and in some instances server 108 and/or 110 as well, as illustrated and described with respect to FIG. 1. In additional examples, method 200 may be carried out by user devices 104a-104e and remote provider 112 and/or 114, and in some instances server 108 and/or 110 as well, operating as part of a cloud-based system. Additionally, method 200 may be performed by one or more other types of computing devices besides those specially illustrated in FIG. 1.

Additionally, although the blocks of method 200 are described below as being completed by an operating system, other components, applications, and/or technologies related to the user device could perform the steps of method 200.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 2. Where used, program code can be stored on any type of computer-readable medium, for example, such as a storage device including a disk or hard drive.

In addition, each block of the flowchart shown in FIG. 2 may represent circuitry that is wired to perform the specific logical functions in the process. Unless specifically indicated, functions in the flowchart shown in FIG. 2 may be executed out of order from that shown or discussed, including substantially concurrent execution of separately described functions, or even in reverse order in some examples, depending on the functionality involved, so long as the overall functionality of the described method is maintained.

At block 210, method 200 may include requesting, by a user device from a remote provider and from a local provider, candidate data for use in autofill for an application displayed on the user device. In some examples, the local provider may be the application itself. In other examples, the local provider may be a local system provider (e.g., an autofill provider associated with the operating system of the user device). The request to the remote provider may be transmitted via wireless communication across a wireless network. The request to the local provider may instead be communicated locally on the user device. In some examples, the requests to the local and remote providers may be sent simultaneously. In other examples, the request to the local provider may be sent first, and the request to the remote provider may only be sent after a response from the local provider is received or a fixed timeout period has elapsed.

In some examples, requests for candidate data may only be sent after a user has authorized autofill for a particular application. In particular, an operating system of a user device may receive, via a UI, authorization to engage in autofill for an application displayed on the UI of the user device. A user may be interacting with a computing device and decide to interact with an application on that device. Once, or before, the user selects the application, he may be prompted to authorize the operating system of the mobile device to help autofill the application and/or other applications. More specifically, the operating system may recognize that the user is interacting with an application and that there is content that may be relevant to autofill the application. The operating system may then prompt the user to authorize the operating system to engage in autofill for the application.

In some examples, the operating system can recognize certain data that is commonly associated with autofill. For instance, the operating system may recognize that an input field of an application contains or is associated with a common autofill descriptor (e.g., "username" or "password"). In response, in this example, the operating system may then prompt the user to set up autofill.

In some examples, before, after, or during the user's response to this prompt, the operating system may also compile a list of one or more remote providers to further aid in facilitating autofill. In one aspect, if there is only one remote provider designated to help facilitate autofill, the user may be prompted with an agreement to use that remote provider. In another aspect, however, if there are multiple remote providers designated to help facilitate autofill, then the user may be prompted to choose a remote provider and also prompted with an agreement to use that remote provider. In yet another aspect, the user may be allowed to choose more than one remote provider, but still may be prompted with an agreement to use each of the chosen remote providers.

Additionally, the operating system may review sensitive and/or personal information when engaging in autofill, and it may be advantageous for the user to be informed of the details of this autofill before consenting to its use. Specifically, because the operating system may review content on the device containing sensitive and/or personal information, the operating system may inform the user of the details underlying the authorization of the autofill before engaging in autofill.

In a further aspect, because the chosen remote provider may receive some information that the user may not typically share, the user may also be prompted to approve an agreement containing the terms for using each of the autofill providers chosen by the user. In some examples, in order to ensure that the user fully understands the details for using these autofill providers, before authorizing the use of autofill, the user may be prompted with an agreement that may include a disclaimer for using the operating system and/or each of the autofill providers chosen by the user for autofill.

In order to request candidate data from a remote provider, the operating system may determine a subset of content displayed on the UI, where the subset excludes user-specific information. In general, the content displayed on the UI refers to any information associated with an application that is ascertainable by the operating system. In one example, this content may include a current view hierarchy of the content displayed on the UI of the user device. Because, however, the content may also contain information that is sensitive and/or private, the operating system determines only a subset of the content which excludes the user-specific information.

In some examples, the user-specific information may include personally identifiable information, or any other information that can be used on its own or with other information to identify, contact, or locate a single person, or to identify an individual in the context of other information or data. In additional examples, the user-specific information may include information that the user has designated as sensitive and/or private.

In still other examples, the user-specific information may include information that has been designated as sensitive and/or private based on one or more factors associated with the user. For example, the user-specific information may include information that has been designated as sensitive and/or private based on the geographical region in which the user, the user device, and/or the remote provider, is located, among other possibilities. In other examples, the user-specific information may include information that has been designated as sensitive and/or private based on an attribute of the user (e.g., the user's age).

The operating system may transmit a request to a remote provider for candidate data for use in autofill for the application, where the request comprises the subset of content displayed on the UI. The request for candidate data may be sent to the remote provider selected to help facilitate the use of autofill on the user device. Specifically, based on the subset of displayed content excluding user-specific information, the operating system may send a request containing information within or associated with this subset of content to the remote provider to alert the remote provider of, amongst other things, potentially Tillable fields displayed on the UI. In any event, this request may be beneficial for the operating system and the user alike as it may allow the remote provider to securely and privately parse the content displayed on the UI to determine what information may be useful for facilitating autofill for the application (e.g., determining which input fields of the application may be auto-filled).

In some examples, the request may include information associated with input fields displayed on the UI. In one aspect, this information may include one or more descriptors associated with the input fields. For example, these descriptors may include terms such as "name," "username," "email," "password," "address," "city," "state," "zip code," "country," "account number," and/or "card number," among other possibilities.

In other examples, the request may include information associated with the current view hierarchy of the user device. In one aspect, this information may include information associated with compiling or maintaining the subset of content displayed on the UI (e.g., underlying script and/or code). In another aspect, this information may include information associated with certain approximations of the subset of content displayed on the UI (e.g, wireframe representations of the subset of content). In yet another aspect, this information may include information associated with the architecture of the subset of content displayed on the UI (e.g., information associated with the relative layout, linear layout, buttons, table layout, table rows, check boxes, and/or other elements).

In some examples, the same content that is sent to the remote provider may also be sent to a local system provider to allow the local system provider to provide candidate data. In other examples, the content sent to a local system provider may not be scrubbed to exclude user-specific information. The local system provider may be prevented from network access to ensure that user information is not compromised. In examples where the local provider is the application itself, it may not be necessary to provide the content to the application in order to request candidate data.

At block 220, method 200 further includes receiving, from the remote provider, a first data set comprising one or more candidate values corresponding to a first set of one or more input fields of the application. In general, the response received from the remote provider may provide data that is helpful to the operating system in facilitating autofill. In some examples, the response may contain data helpful to the operating system in facilitating autofill in the first instance. For example, the response may contain a data set comprising a set of candidate values linked to a set of one or more corresponding input fields of the application displayed on the UI.

In other examples, the response received from the remote provider may elicit further input data from the user before disclosing the information requested by the operating system. Specifically, the response may contain a pre-communication signal eliciting the input of data associated with the user before sending the data set requested by the operating system. In some examples, this input data may include data associated with the user's fingerprint or some other biometric data. In a further aspect, once this request for input data is received by the operating system, the operating system may generate and display a secure authorization prompt to apprise the user of this request. In yet a further aspect, the operating system may also facilitate the receipt of the input data and transmit a confirmation signal (which may include the input data) to the remote provider. For example, if the requested data pertained to the user's fingerprint data, the operating system may display a secure authorization prompt eliciting the user's fingerprint data, manage one or sensors directed at attaining the user's fingerprint data, receive the user's fingerprint data via one or more of those sensors, and then generate and transmit a confirmation signal (which may include the user's fingerprint data) to the remote provider.

At block 230, method 200 further includes receiving, from the local provider, a second data set comprising one or more candidate values corresponding to a second set of one or more input fields of the application. The second set of input fields may include the same input fields as the first set, or it may include different input fields. Either way, the second data set may include one or more different candidate values than the first data set. The second data set may be received before, at the same time as, or after the first data set.

At block 240, method 200 further includes detecting that an input field of the application has focus, where the input field is included in the first set and the second set. This detection may be referred to as an autofill trigger event. Autofill trigger events may provide information about the current state of the user device, or an application thereon, including the state of user's interaction with the device. Autofill trigger events may also be used to help the operating system know when to engage in authorized autofill at the right points in time. In some examples, autofill triggers events may be direct or indirect user interactions with the device.

An input field of the application may be determined to have focus after a user's initiation of an application, a user's selection of the input field via the UI, or a request from the user to set up autofill for an application, among other scenarios. In a further aspect, the user's interaction with an input field of the user device may be reflected by a graphic, such as a keyboard, displayed on the UI.

At block 250, method 200 may further include responsively causing a selectable list to be displayed on the user device. The selectable list may include a first selectable option corresponding to the first data set from the remote provider and a second selectable option corresponding to the second data set from the local provider. The selectable list may be presented as a drop-down or a different UI element. A graphical icon or other indicator may be included in the selectable list next to each selectable option to identify the source of the corresponding data set. In some cases, more than two selectable options may be presented. In particular, the remote provider and/or the local provider may provide multiple data sets. In additional examples, multiple remote providers and/or multiple local providers may each provide data sets to be included in the selectable list.

At block 260, method 200 may further include receiving user input data indicating a selected data set from the selectable list. More specifically, the user may select a single data set to use for autofill. The UI may provide information to the user in the form of graphics, text, or other content, so that the user understands whether the source of the selected data set is the remote provider or the local provider.

At block 270, method 200 may further include responsively filling one or more candidate values from the selected data set into one or more corresponding input fields of the application displayed on the UI. The operating system can ensure that the one or more input fields displayed on the UI are filled, accurately and completely, with the corresponding one or more candidate values. In particular, the operating system may determine the location and sequence of the input fields to be filled with the candidate values on the UI and collate the candidate values accordingly before filling the input fields with the corresponding one or more candidate values.

In some examples, the operating system may determine whether the one or more input fields corresponding to the one or more candidate values to be used for autofill are actually displayed on the UI. For example, if the candidate values to be used for autofill correspond to input fields for "username," "password," and "address," but the operating system determines the only input fields displayed on the UI are for "username" and "password," then the operating system may take further action. In one example, the operating system may simply disregard the extraneous candidate value. In another example, the operating system may send a message apprising the remote provider or the local provider that the extraneous candidate value was sent in error.

In yet another aspect, the operating system may determine whether the one or more input fields may actually be filled with the corresponding one or more candidate values. For example, if one or more of the candidate values to be used for autofill do not comply with a parameter of the input fields to which they correspond, then the operating system may take further action. In one example, a candidate value may contain noncompliant characters (e.g., too many characters, incorrect character type, etc.) in view of one or more requirements of the corresponding input field. For example, if the input field requires a three digit numeric card verification code and the corresponding candidate value is the word "Faulkner," then the candidate value may contain noncompliant characters for at least two reasons (noncompliant length and noncompliant character type). In response, in one example, the operating system may simply disregard the noncompliant candidate value. In another example, the operating system may send a message apprising the remote provider or the local provider that the noncompliant candidate value was sent in error. In yet another example, the operating system may use some portion of the noncompliant candidate value (e.g., the first three characters, "Fau") to approximate one or more of the input field requirements. Other illustrative examples are certainly possible.

In further examples, after the candidate data from the selected data set is used to autofill input fields of the application, the user may then select a different input field which was not already autofilled. However, one or more other data sets from the same provider or a different provider may include a candidate value for the different input field. A separate selectable list may then be displayed to allow the user to autofill one or more additional input fields of the application with data from a different data set. In this manner, data from both a local provider and a remote provider may be used to collaboratively autofill a single application (e.g., where the local provider is the only provider with candidate data for certain input fields and the remote provider is the only provider with candidate data for other input fields).

IV. Additional Explanatory Figures and Examples

Figure 3:
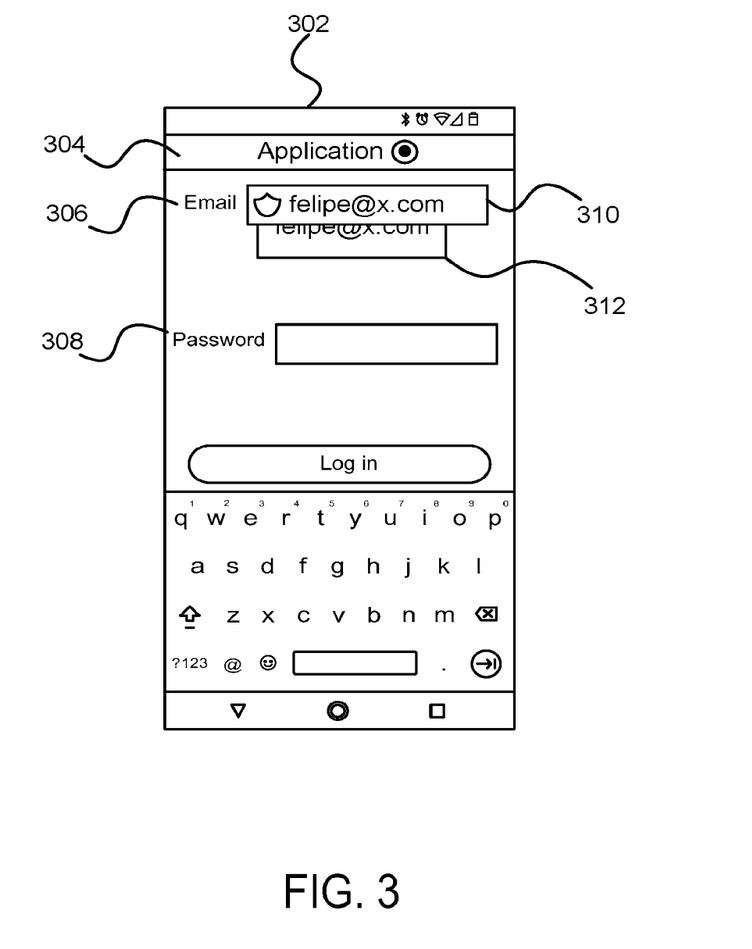
FIG. 3 illustrates a UI of a user device, in accordance with example embodiments.

FIG. 3 illustrates a UI of a user device, in accordance with example embodiments. In particular, a user device 302 such as a cellular phone may display a portion of application 304 on the user device 302. The application 304 may also include input fields containing or associated with common autofill descriptors, including descriptor 306 ("email") and descriptor 308 ("password"). In this example, the operating system of the user device 302 may request and receive candidate data from a remote provider. The operating system may display a candidate value 310 over an input field associated with descriptor 306. However, application 304 may have its own autofill data and associated autofill UI, as shown by dropdown 312. In this case, the popup provided by application 304 may conflict with the UI functionality provided by the operating system to display a candidate value from the remote provider.

Some example systems may involve the operating system preventing the application from displaying an autofill dialog specific to the application. For instance, a callback mechanism may be provided, which application developers can use to hide their own popup windows when the operating system displays its own popup. However, such a solution only mitigates the problem by not displaying conflicting UIs, rather than integrating autofill data from the application into a single consistent autofill UI. For example, web browsers often provide their own password manager. Therefore, an API which supports autofill with a remote provider in combination with a browser's own password manager may be particularly useful.

Figure 4:
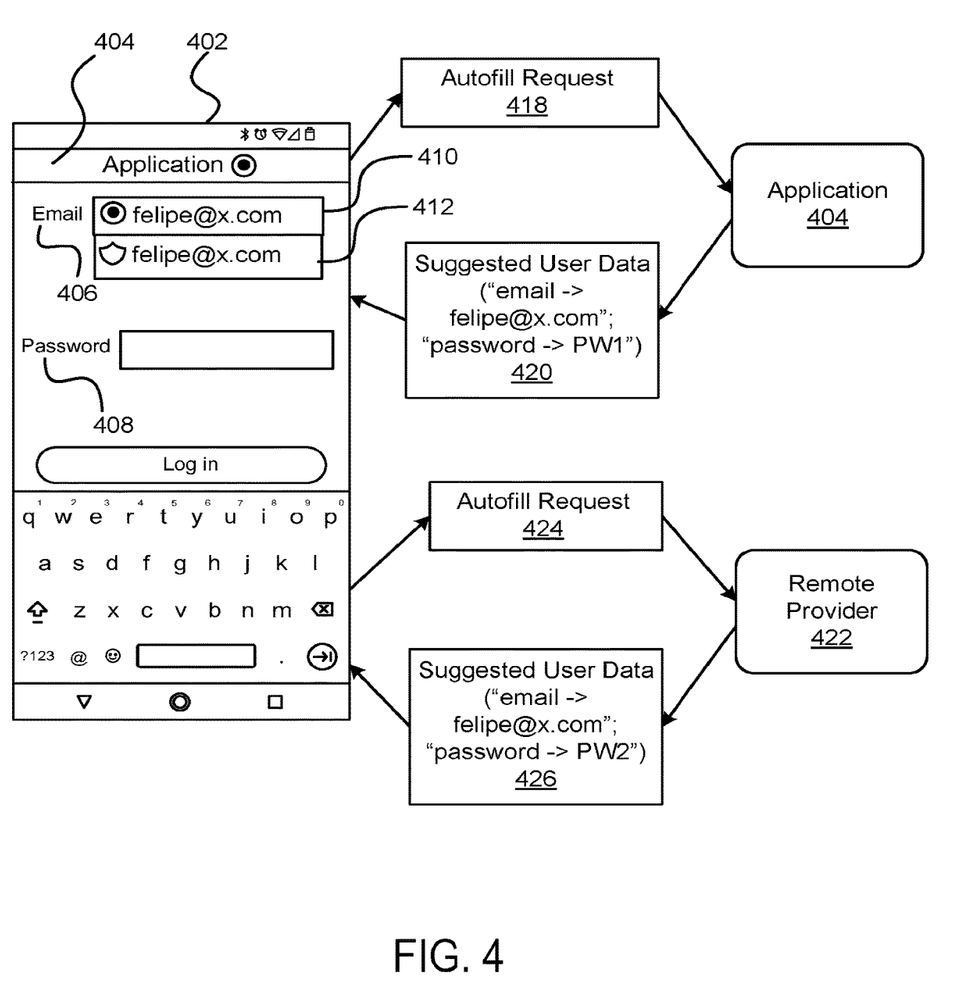
FIG. 4 illustrates a UI of a user device communicating with multiple autofill providers, in accordance with example embodiments.

FIG. 4 illustrates a UI of a user device communicating with multiple autofill providers, in accordance with example embodiments. In particular, user device 402 may be running application 404, which displays descriptor 406 ("email") and descriptor 408 ("password") associated with respective input fields of application 404. User device 402 may request and receive candidate data from both a remote provider and from application 404 in order to present selectable options to the user. In particular, a selectable list may be displayed with candidate value 410 received from application 404 and also candidate value 412 received from a remote provider. A graphical icon may be included with each selectable option to distinguish the source of the candidate data. Depending on which selectable option is selected by a user, a corresponding password may be autofilled into the input field associated with descriptor 408.

To retrieve candidate value 410, user device 402 may provide autofill request 418 to application 404. Application 404 may in turn provide candidate data 420, which includes suggested values for both the email field and the password field. In order to enable application 404 to provide its own data sets, a method may be provided as part of an API, such as List<Dataset> provideAutofillData( ). Data sets provided by the application may be stored in objects accessible by the operating system so that the operating system can display the data sets as if they were data sets provided by a remote provider. However, the data sets may include views created by the operating system which include an icon identifying the application and/or a printable name identifying the application as the source of the candidate data.

To retrieve candidate value 412, user device 402 may also provide autofill request 424 to remote provider 422. Remote provider 422 may in turn provide candidate data 426, which includes suggested values for both the email field and the password field. More specifically, the operating system of user device 402 may recognize that the email field has focus, determine a subset of the content displayed on the UI that excludes user-specific information, transmit that subset of content to the remote provider 422 (e.g., using wireless communication), and receive a response from the remote provider in the form of candidate data 426.

The autofill UI of user device 402 may therefore have acquired two data sets, one provided by application 404 and one provided by remote provider 422. To make the difference clear for the user, separate icons for the application 404 and the remote provider 422 may be displayed within a selectable list. Because remote provider 422 may typically display its own icon in the presentation of its data set, a flag may be provided to the remote provider 422 (e.g., FLAG_NO_ICON) to let the remote provider 422 know that the operating system will handle displaying the icons.

Figure 5:
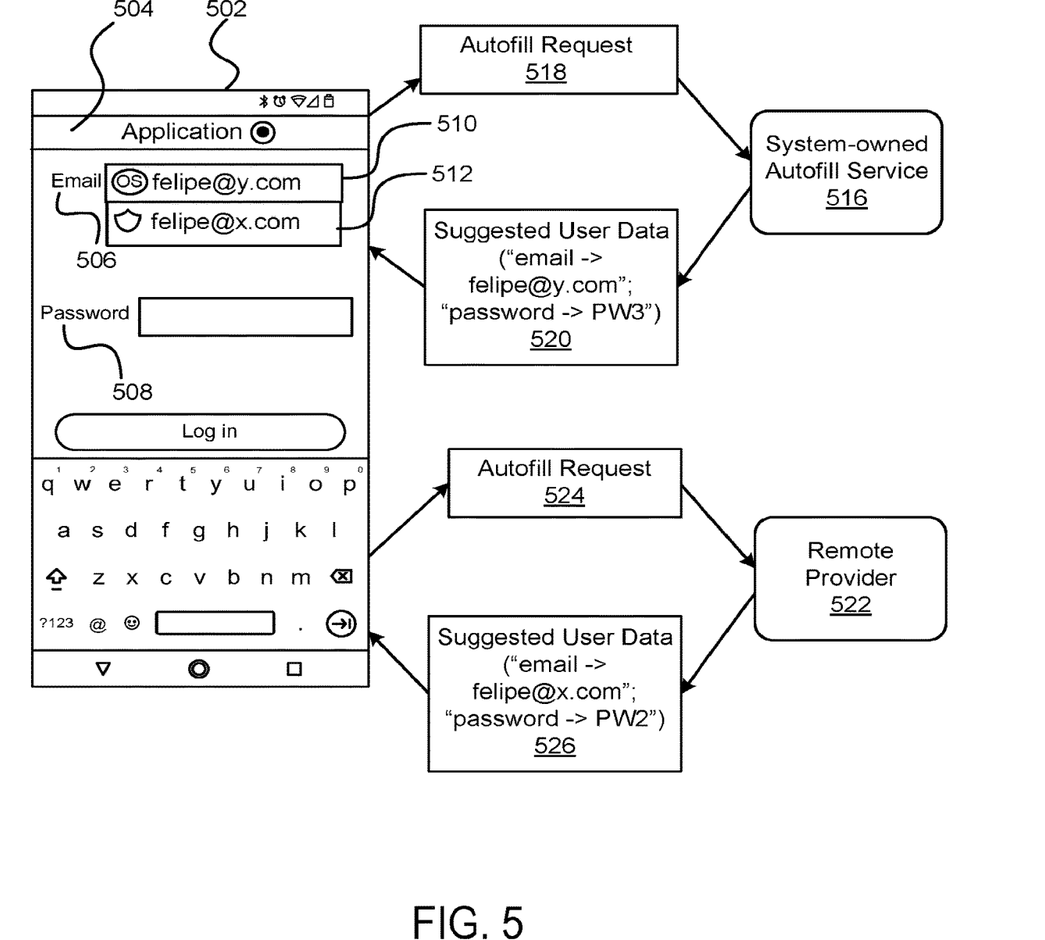
FIG. 5 illustrates another UI of a user device communicating with multiple autofill providers, in accordance with example embodiments.

FIG. 5 illustrates another UI of a user device communicating with multiple autofill providers, in accordance with example embodiments. In particular, user device 502 may be running application 504, which displays descriptor 506 ("email") and descriptor 508 ("password") associated with respective input fields of the application 504. In this case, user device 502 may request and receive candidate data from both a remote provider and from a system-owned autofill service (also referred to as a local system provider) in order to present selectable options to the user. In particular, a selectable list may be displayed with candidate value 510 received from a system-owned autofill service and also candidate value 512 received from a remote provider. A graphical icon may be included with each selectable option to distinguish the source of the candidate data. Depending on which selectable option is selected by a user, a corresponding password may be autofilled into the input field associated with descriptor 508.

To retrieve candidate value 510, user device 502 may provide autofill request 518 to system-owned autofill service 516. System-owned autofill service 516 may in turn provide candidate data 520, which includes suggested values for both the email field and the password field. From the API point of view, the local system provider may be treated like a regular remote provider. In particular, the same content displayed by the application on the UI may be captured and sent to the local system provider to enable the local system provider to provide candidate data. However, because the local system provider is a system component, the data may not need to be scrubbed to remove user-specific information for this request. The local system provider may also be prevented from accessing the network to avoid compromising user data.

In some examples, the local system provider may be sent request 518 before any request is sent to a remote provider (e.g., to determine whether the FLAG_NO_ICON flag should be set). Accordingly, an aggressive timeout period (e.g., 1 second) may set to wait for a response from the local system provider. In further examples, separate flags may be set for an application and a local system provider to indicate whether each has available candidate data in order to allow a remote provider to better customize its response.

To retrieve candidate value 512, user device 502 may also provide autofill request 524 to remote provider 522. Remote provider 522 may in turn provide candidate data 526, which includes suggested values for both the email field and the password field. More specifically, the operating system of user device 502 may recognize that the email field has focus, determine a subset of the content displayed on the UI that excludes user-specific information, transmit that subset of content to the remote provider 522, and receive a response from the remote provider in the form of candidate data 526.

The autofill UI of user device 502 may therefore have acquired one data set provided by system-owned autofill service 516 and one data set provided by remote provider 522. To make the difference clear for the user, separate icons for the system-owned autofill service 516 and the remote provider 522 may be displayed within the selectable list.

Figure 6:
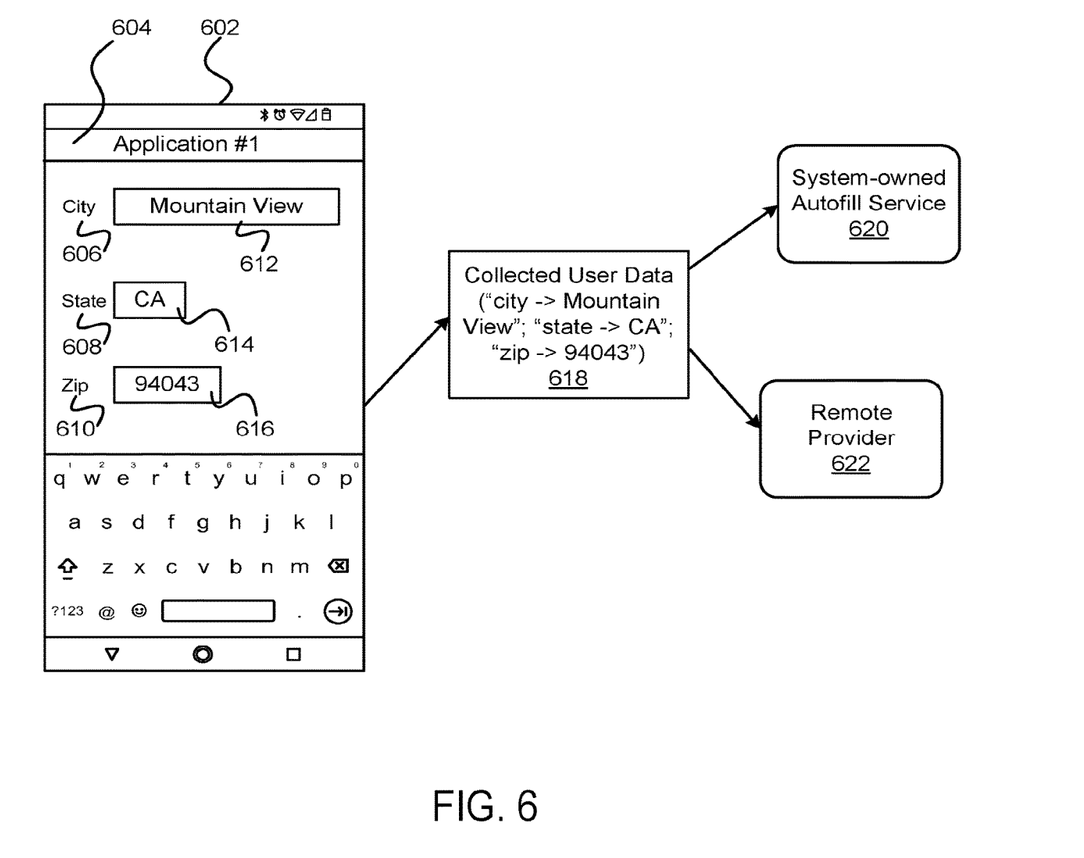
FIG. 6 illustrates a user device collecting user input data for multiple autofill providers, in accordance with example embodiments.

FIG. 6 illustrates a user device collecting user input data for multiple autofill providers, in accordance with example embodiments. More specifically, user device 602 may be running an application 604. The application 604 may include input fields associated with descriptors 606, 608, and 610. A user may input values 612, 614, and 616 into the input fields. After receiving user consent, the input values may be collected in the form of collected user data 618. The collected user data 618 may be provided to both system-owned autofill service 620 and remote provider 622. The processing needed to collect this data may only need to be performed once, but the information may be leveraged by both the system-owned autofill service 620 and remote provider 622. For instance, the system-owned autofill service 620 may use this information to determine how to autofill a second application which the user may run on user device 602 after application 604.

More specifically, a local system provider may determine autofill data based on recent user interactions with one or more applications. In some examples, leveraging input data from recent user interactions with applications may involve the local system provider using a machine learning model trained to identify input fields of the applications. In further examples, a hook may be provided to allow third-party applications to explicitly add autofill hints to the local system provider. In particular, an autofill hint may allow a third-party application to identify particular input fields for which user input values should be considered for future autofill in other applications. In this manner, a local system provider may facilitate collaborative sharing of user data between different third-party applications.

In examples where the local provider is the application itself, it may not be necessary to provided collected data to the application because the application has full control of its lifecycle and therefore may not need to be provided with the data. However, a callback mechanism may be provided so that the application (e.g., a web browser) can coordinate whether or when to show its own save UI based on system UI functionality for saving autofill data.

V. Example Computing Device

Figure 7:
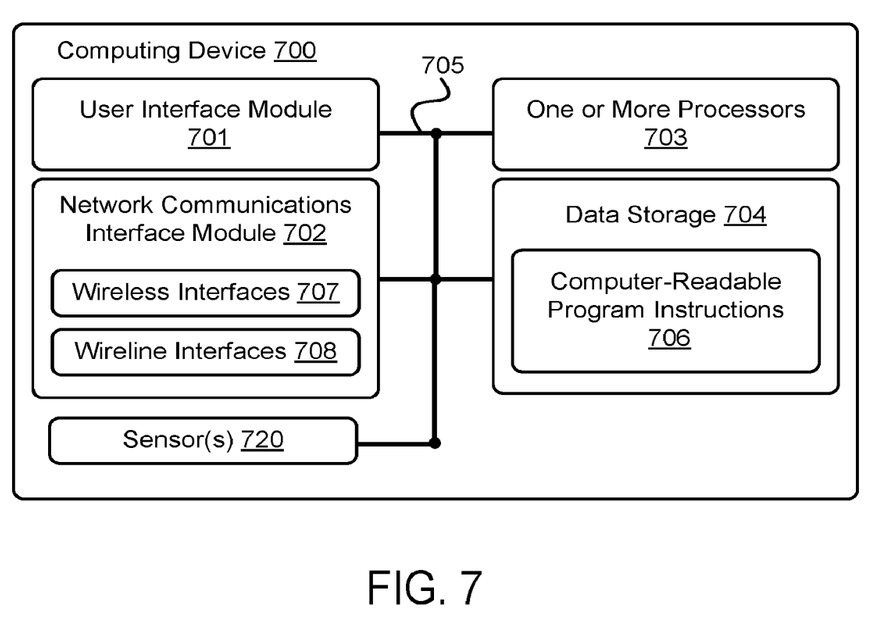
FIG. 7 is a functional block diagram of a computing device, in accordance with example embodiments.

FIG. 7 is a functional block diagram of computing device 700, in accordance with example embodiments. In particular, computing device 700 can be configured to perform at least one function of server device 108 and/or 110, and/or remote provider 112 and/or 114, any of user device 104*a*-104*e*, method 200, user device 302, user device 402, user device 502, and/or user device 602 as previously described.

Computing device 700 may include a user interface module 701, a network-communication interface module 702, one or more processors 703, data storage 704, and one or more sensors 720, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a presence-sensitive display, a computer mouse, a track ball, a joystick, a camera, a voice recognition module, and/or other similar devices. User interface module 701 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices. User interface module 701 can further be configured with one or more haptic devices that can generate haptic output(s), such as vibrations and/or other outputs detectable by touch and/or physical contact with computing device 700. In some embodiments, user interface module 701 can be used to provide a GUI for utilizing computing device 700.

Network-communications interface module 702 can include one or more wireless interfaces 707 and/or one or more wireline interfaces 708 that are configurable to communicate via a network. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

One or more processors 703 can include one or more general purpose processors, and/or one or more special purpose processors (e.g., digital signal processors, graphics processing units, application specific integrated circuits, etc.). One or more processors 703 can be configured to execute computer-readable program instructions 706 that are contained in data storage 704 and/or other instructions as described herein.

Data storage 704 can include one or more computer-readable storage media that can be read and/or accessed by at least one of one or more processors 703. The one or more computer-readable storage media can include volatile and/or non-volatile storage components, such as optical, magnetic, organic or other memory or disc storage, which can be integrated in whole or in part with at least one of one or more processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706 and perhaps additional data. In some embodiments, data storage 704 can additionally include storage required to perform at least part of the herein-described methods, scenarios, and techniques and/or at least part of the functionality of the herein-described devices and networks.

In some embodiments, computing device 700 can include one or more sensors 720. Sensor(s) 720 can be configured to measure conditions in an environment of computing device 700 and provide data about that environment. For example, sensor(s) 720 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) sensors to measure locations and/or movements of computing device 700, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 700, such as, but not limited to, an infrared sensor, an optical sensor, a light sensor, a camera, a biosensor, a biometric sensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 700, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 720 are possible as well.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A method comprising:
   requesting, by a user device from a first provider and from a second provider, candidate data for use in autofill for an application displayed on the user device, wherein requesting the candidate data comprises transmitting a subset of content displayed on the user device to each of the first provider and the second provider;
   receiving, from the first provider, a first data set comprising one or more candidate values corresponding to a first set of one or more input fields of the application;
   receiving, from the second provider, a second data set comprising one or more candidate values corresponding to a second set of one or more input fields of the application;
   detecting that an input field of the application has focus, wherein the input field is included in the first set and the second set;
   responsive to detecting that the input field of the application has focus, causing a selectable list to be displayed on the user device, wherein the selectable list includes a first selectable option corresponding to the first data set from the first provider and a second selectable option corresponding to the second data set from the second provider;
   receiving user input data indicating a selected data set from the selectable list; and
   responsive to receiving the user input data, filling one or more candidate values from the selected data set into one or more corresponding input fields of the application.

2. The method of claim 1, wherein the application comprises the first provider.

3. The method of claim 2, wherein the application is a web browser.

4. The method of claim 1, further comprising preventing the application from displaying an autofill dialog specific to the application.

5. The method of claim 1, wherein the first provider is a system-provided service provided by an operating system of the user device.

6. The method of claim 5, wherein the first provider is prevented from network access by the operating system of the user device.

7. The method of claim 1, wherein the first provider provides the one or more candidate values of the first data set based on recent user interaction with one or more other applications on the user device.

8. The method of claim 7, wherein the first provider comprises a machine learning model trained to identify input fields of the one or more other applications.

9. The method of claim 7, wherein the first provider provides the one or more candidate values of the first data set based on one or more hints from the one or more other applications which identify one or more input fields of the one or more other applications.

10. The method of claim 1, further comprising collecting one or more user input values from user interaction with a different application and providing the one or more user input values to the first provider and to the second provider for future use in autofill.

11. The method of claim 1, wherein the first selectable option comprises a first graphical indicator associated with the first provider and wherein the second selectable option comprises a second graphical indicator associated with the second provider.

12. The method of claim 1, wherein requesting the candidate data from the first provider and second provider is performed simultaneously.

13. The method of claim 1, wherein requesting the candidate data from the first provider is performed first, and wherein requesting the candidate data from the second provider comprises indicating to the second provider whether the first provider provided any candidate data for the application.

14. The method of claim 13, wherein requesting the candidate data from the first provider is performed with a fixed timeout window.

15. The method of claim 1, wherein the first provider and the second provider are selectable from a list of remote providers available on the user device.

16. The method of claim 1, further comprising:
   after filling the one or more candidate values from the selected data set into the one or more corresponding input fields of the application, detecting that a different input field of the application has focus, wherein the different input field was not previously autofilled; and
   responsively causing a different selectable list to be displayed on the user device, wherein the different selectable list does not include a selectable option corresponding to a previously selected data set.

17. A user device comprising:
   one or more processors; and
   one or more non-transitory computer-readable media that stores program code, wherein the program code, when executed by the one or more processors, causes the one or more processors to:
     request, from a first provider and from a second provider, candidate data for use in autofill for an application displayed on the user device, wherein requesting the candidate data comprises transmitting a subset of content displayed on the user device to each of the first provider and the second provider;
     receive, from the first provider, a first data set comprising one or more candidate values corresponding to a first set of one or more input fields of the application;
     receive, from the second provider, a second data set comprising one or more candidate values corresponding to a second set of one or more input fields of the application;
     detect that an input field of the application has focus, wherein the input field is included in the first set and the second set;

responsive to detecting that the input field of the application has focus, cause a selectable list to be displayed on the user device, wherein the selectable list includes a first selectable option corresponding to the first data set from the first provider and a second selectable option corresponding to the second data set from the second provider;

receive user input data indicating a selected data set from the selectable list; and responsive to receiving the user input data, fill one or more candidate values from the selected data set into one or more corresponding input fields of the application.

18. The user device of claim 17, wherein the first provider is a system-provided service provided by an operating system of the user device, and wherein the second provider is a remote provider.

19. A non-transitory computer readable medium having stored therein instructions executable by one or more processors to cause a user device to perform functions comprising:

requesting, from a first provider and from a second provider, candidate data for use in autofill for an application displayed on the user device, wherein requesting the candidate data comprises transmitting a subset of content displayed on the user device to each of the first provider and the second provider;

receiving, from the first provider, a first data set comprising one or more candidate values corresponding to a first set of one or more input fields of the application;

receiving, from the second provider, a second data set comprising one or more candidate values corresponding to a second set of one or more input fields of the application;

detecting that an input field of the application has focus, wherein the input field is included in the first set and the second set;

responsive to detecting that the input field of the application has focus, causing a selectable list to be displayed on the user device, wherein the selectable list includes a first selectable option corresponding to the first data set from the first provider and a second selectable option corresponding to the second data set from the second provider;

receiving user input data indicating a selected data set from the selectable list; and responsive to receiving the user input data, filling one or more candidate values from the selected data set into one or more corresponding input fields of the application.

20. The non-transitory computer readable medium of claim 19, wherein the first provider is a system-provided service provided by an operating system of the user device, and wherein the second provider is a remote provider.

\* \* \* \* \*